(12) United States Patent
Sourour et al.

(10) Patent No.: US 6,839,378 B1
(45) Date of Patent: Jan. 4, 2005

(54) METHOD AND APPARATUS FOR MULTIPATH DELAY ESTIMATION IN DIRECT SEQUENCE SPREAD SPECTRUM COMMUNICATION SYSTEMS

(75) Inventors: Essam Sourour, Raleigh, NC (US); Greg Bottomley, Cary, NC (US); Rajaram Ramesh, Cary, NC (US); Sandeep Chennakeshu, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 977 days.

(21) Appl. No.: 09/005,580

(22) Filed: Jan. 12, 1998

(51) Int. Cl.$^7$ .............................................. H04B 1/69
(52) U.S. Cl. ...................................................... 375/142
(58) Field of Search ................................. 375/142, 150

(56) References Cited

U.S. PATENT DOCUMENTS

| | | | |
|---|---|---|---|
| 4,007,330 A | * 2/1977 | Winters ....................... | 375/330 |
| 4,550,414 A | * 10/1985 | Guinon et al. ............... | 375/207 |
| 5,414,729 A | 5/1995 | Fenton | |
| 5,493,588 A | * 2/1996 | Lennen ........................ | 375/343 |
| 5,615,232 A | 3/1997 | Van Nee | |
| 5,692,008 A | * 11/1997 | Van Nee ..................... | 375/208 |
| 5,809,064 A | * 9/1998 | Fenton et al. ................ | 375/208 |

FOREIGN PATENT DOCUMENTS

EP 0 654 677 A1 5/1995
WO 95/17784 6/1995

OTHER PUBLICATIONS

"Spread Spectrum Communications", by M.K. Simon, J.K. Omura, R.A. Scholz and B.K. Levitt, vol. III, Computer Science Press, 1985, pp. 66–75.
Robert L. Bogusch, Fred W. Guigliano, Dennis L. Knepp, and Allen H. Michelet, "Frequency Selective Propagation Effects on Spread–Spectrum Receiver Tracking", Proceedings of the IEEE, vol. 69, No. 7, Jul. 1981, pp. 787–796.
Standard Search Report dated Oct. 1, 1998.

* cited by examiner

*Primary Examiner*—Kevin M Burd
(74) *Attorney, Agent, or Firm*—Myers Bigel Sibley & Sajovec, P.A.

(57) ABSTRACT

Multipath delay estimation of a direct sequence spread spectrum (DS-SS) signal transmitted in a multipath fading channel is accomplished by measuring the envelope of the signal to determine a new delay estimate. Delay estimates are also obtained in ray strength order, by subtracting out the influence of the stronger rays on the weaker ones. This subtraction approach can be performed iteratively, allowing further refinement of the delay estimates. Delay estimates can also be determined by minimizing the mean square error (MSE) between a measured correlation function and a modeled correlation function. The minimum mean square error (MMSE) approach can performed iteratively, to further refine the delay estimates. Maximum likelihood (ML) delay estimates can also be obtained by exploiting side information regarding the transmit and receive pulse shapes.

42 Claims, 13 Drawing Sheets

METHOD AND APPARATUS FOR MULTIPATH DELAY ESTIMATION IN DIRECT SEQUENCE SPREAD SPECTRUM COMMUNICATION SYSTEMS

FIELD OF THE INVENTION

The present invention relates to a method and apparatus for estimating multipath radio signal transmission delays, and more particularly to a method and apparatus for estimating multipath signal delays in telecommunications systems that use direct sequence spread spectrum techniques.

BACKGROUND OF THE INVENTION

The field of wireless communications is expanding at a phenomenal rate, as more radio spectrum becomes available for commercial use and as cellular phones become commonplace. In addition, there is currently an evolution from analog communications to digital communications. In digital communications, speech is represented by a series of bits which are modulated and transmitted from a base station to a phone. The phone demodulates the received waveform to recover the bits, which are then converted back into speech. There is also a growing demand for data services, such as e-mail and Internet access, which require digital communications.

There are many types of digital communications systems. Traditionally, frequency division-multiple-access (FDMA) is used to divide the spectrum up into a plurality of radio channels corresponding to different carrier frequencies. These carriers may be further divided into time slots, a technique referred to as time-division-multiple-access (TDMA), as is done in the D-AMPS, PDC, and GSM digital cellular systems.

If the radio channel is wide enough, multiple users can use the same channel using spread spectrum (SS) techniques and code-division-multiple-access (CDMA). IS-95 and JSTD-008 are examples of CDMA standards. With direct sequence spread spectrum (DS-SS), information symbols are represented by sequences of symbols referred to as chips. This spreads the information symbols in the frequency band. At the receiver, correlations to the chip sequences are used to recover the information symbols. Spreading allows the system to operate at a low chip signal-to-noise ratio (SNR). If thermal noise is not too great, then noise from other users is tolerable and multiple user signals can occupy the same bandwidth at the same time.

The radio signal is reflected and scattered off of various objects, giving rise to multipath propagation. As a result, multiple images of the signal arrive at the receive antenna. When these images have roughly the same delay, relative to the chip period, then they give rise to fading. Fading occurs because the images add sometimes constructively, and sometimes destructively. When these images arrive with different delays relative to the chip period, they can be viewed as echoes of the signal and are often referred to as "resolvable multipaths", "rays", or simply "multipaths".

To communicate efficiently and reliably, the receiver should exploit the multipath fading channel by collecting signal energy from the different multipaths. This is achieved by employing a RAKE receiver, which individually detects each echo signal using a correlation method, corrects for different time delays, and combines the detected echo signals coherently. The RAKE receiver includes a number of processing elements or "fingers". The receiver must estimate the delays of the multipaths and assign a finger to each delay. The finger then despreads that signal image. The finger outputs are RAKE combined by weighting them and adding them together.

For mobile communications, the phone or the environment moves, so that multipath delays change over time. To maintain performance, the delay estimation procedure must be able to track the multipath delays. Traditional approaches to delay tracking are the early/late gate and tau-dither approaches. With these approaches, the signal energy is measured slightly before and slightly after the estimated delay. When the estimated delay is correct, then the early and late measurements should be approximately equal, as the chip pulse waveform falls off symmetrically about its peak. When an imbalance is detected, the delay estimate is adjusted to restore balance.

Specifically, an early-late gate (ELG) for each RAKE receiver finger operates as follows. Each ELG is provided with an initial estimate of the delay, $\tau_{est}$, of one of the channel paths. The initial delay estimates for each path are typically within half a pseudo-noise (PN) code chip from the exact delay, $\tau_{exact}$, of that path, i.e., $|\tau_{exact} - \tau_{est}| \leq 0.5 T_c$. The ELG makes two correlations between the local PN code and the received DS-SS signal. One correlation uses a delay $\tau_{est} + \delta$, i.e., early correlation, while the other uses a delay, $\tau_{est} - \delta$, i.e., late correlation. The value of $\delta$ is typically $0.5 T_c$, or slightly less. FIG. 1 shows an example of the correlation function of the received SS signal versus $\tau$. The early and late correlations are given by $C(\tau_{est} + \delta)$ and $C(\tau_{est} - \delta)$, respectively.

The results of the early and late correlations, $C(\tau_{est} + \delta)$ and $C(\tau_{est} - \delta)$, are compared and the initial estimation $\tau_{est}$ is updated. For example, in FIG. 1 the early correlation result $C(\tau_{est} + \delta)$ is larger than the late correlation result $C(\tau_{est} - \delta)$. Hence, the initial assigned delay $\tau_{est}$ is increased by a small value $\epsilon < \delta$, and the new estimate becomes $\tau_{est/new} = \tau_{est/old} + \epsilon$. The process is continuously repeated. Eventually, the estimated delay $\tau_{est}$ converges to the exact channel path delay $\tau_{exact}$ after a number of iterations. In this case, i.e., when rest $\tau_{est} = \tau_{exact}$ the results of the early and late correlations become equal and $\tau_{est}$ is not changed any more. The ELG relies on the fact that the correlation function resulting from the correlation of the transmitted SS code and the local code is symmetrical. Hence, when $\tau_{est} = \tau_{exact}$ the early and late correlation results at $\tau_{est} + \delta$ and $\tau_{est} - \delta$ are equal. This is the case when the channel, shown by block 304 in FIG. 3, is a single path. FIG. 1 shows an example of the correlation function in this case. However, when the channel shown in block 304 of FIG. 3 is a multipath fading channel, the correlation function is no longer symmetrical.

For example, FIG. 2 shows the correlation function in a two path fading channel. The total correlation function due to the combination of two paths is given by the dashed line. If the channel has two paths at delays $\tau_{1,exact}$ and $\tau_{2,exact}$, where $\tau_{1,exact} < \tau_{2,exact}$, then the ELG assigned to track the second path will have different correlation values at the early correlation at $\tau_{2,est} + \delta$ and the late correlation at $\tau_{2,est} - \delta$ even if $\tau_{2,est} = \tau_{2,exact}$. The late correlation is more influenced by interference from the other path than the early correlation. Hence, as shown in FIG. 2, even if $\tau_{2,est} = \tau_{2,exact}$ the early and late correlations are not equal and $\tau_{2,est}$ will be increased or decreased by $\epsilon$ until the early and late correlations are equal. When the early and late correlations are equal, $\tau_{2,est} \neq \tau_{2,exact}$. Hence, in a multipath fading channel the conventional ELG is not able to track the multipath delays accurately. This shortcoming is reported in "Frequency Selective Propogation Effects on Spread Spectrum Receiver Tracking" by Robert L. Bogusch, Fred W. Guigliano, Dennis L. Knepp, and Allen H. Michelet, Proceedings of the the IEEE, Vol. 69, No. 7, July 1981, but no solution is provided.

An alternative to the ELG approach is given in Baier et al., "Design study for a CDMA-based third-generation mobile radio system", IEEE Journal on Selected Areas in Communications, vol. 12, pp. 733–743, May 1994. In this paper, the baseband signal is sampled twice per chip period. Delays are estimated on a frame by frame basis. Data are despread using data-dependent despreading sequences and a matched filter (sliding correlator). This provides a sequence of correlation values corresponding to delays spaced $T_c/2$ apart, where $T_c$ is the chip period. The magnitude squared of this sequence is taken and then averaged with other measurements, providing an estimated delay power spectrum. This delay spectrum is then searched for the strongest rays.

One concern with this approach is that, when the chip pulse shape is fairly broad, the approach will find several peaks next to each other, which really correspond to only one ray. This problem would become more pronounced should more samples per chip be taken.

Another concern, which was also a concern for the ELG approach, is the interpath interference. This can cause peaks to be selected that do not correspond to the actual delays.

SUMMARY OF THE INVENTION

The present invention solves the problem of multipath delay estimation when a direct sequence spread spectrum (DS-SS) signal is transmitted in a multipath fading channel. In one embodiment, the envelope of the signal about the delay estimate is measured and used to determine a new delay estimate. In another embodiment, delay estimates are obtained in ray strength order, subtracting out the influence of the stronger rays on the weaker ones. The subtraction approach can be performed iteratively, allowing further refinement of the delay estimates. Delay estimates can also be determined by minimizing or maximizing a metric. The metric-based approach can also be performed iteratively. In particular, two metrics are considered; minimum mean square error (MMSE) and maximum likelihood (ML).

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

The present invention will now be described in conjunction with a pilot channel based system, such as the IS-95 downlink. The pilot channel for such a system is unmodulated. However, the present invention is also applicable to other systems, such as systems which employ a modulated pilot channel, pilot symbols, or no pilot information at all. Also, the present invention is described in the context of delay tracking. However, the present invention can also apply to initial delay estimation, in which there are no previously estimated delays to update.

Figure 3:
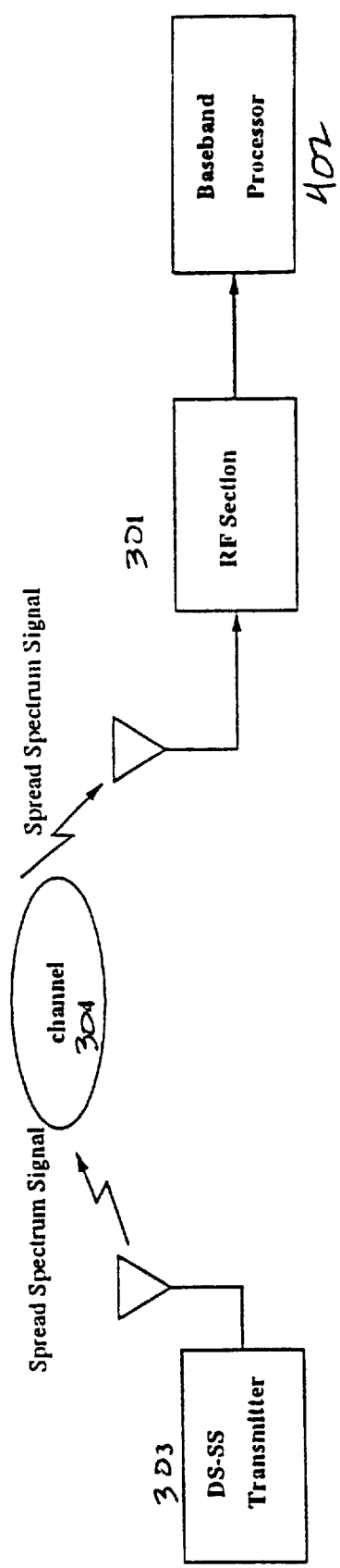
FIG. 3 is a block diagram of a direct sequence spread spectrum communication system consistent with the invention.

A DS-SS communication system employing the present invention is illustrated in FIG. 3. A DS-SS transmitter 303 transmits a DS-SS signal through the radio channel 304. It is received by a receiver, which consists of an RF section 301 and a baseband processor 402. The RF section amplifies, filters, and mixes the signal down to a baseband frequency, typically 0 Hz. The signal is also typically sampled and quantized, producing data samples. For illustration purposes, we assume that there are N samples per chip period $T_c$.

Figure 4:
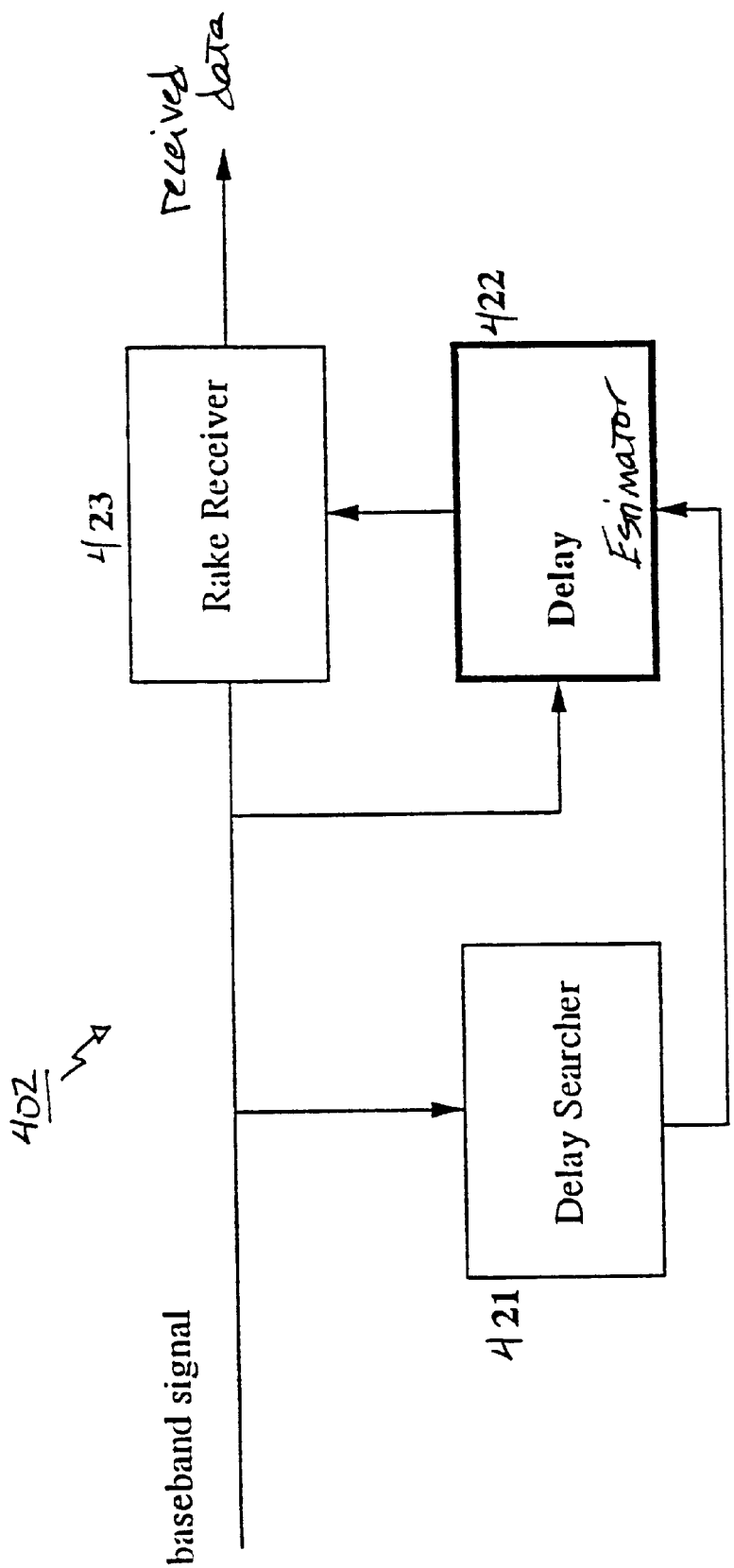
FIG. 4 is a block diagram showing the baseband processor of FIG. 3 in greater detail.

The baseband processor 402 is shown in detail in FIG. 4. The baseband signal is supplied to a delay searcher 421, delay estimator 422 and a RAKE receiver 423. The delay searcher 421 makes initial, coarse estimates of the multipath delays and provides the delay estimator 422 with these initial estimates. The RAKE receiver 423 includes a number of demodulating fingers. Each RAKE receiver finger needs to be continuously synchronized with one of the channel paths. This means that the misalignment between the local despreading code used in this finger and the received despreading code of one of the channel paths must be close to zero. Thus, the RAKE receiver must be provided with the delays of the multipaths in the channel.

The delay estimator 422 refines the multipath delay estimates provided by the delay searcher, and continues to track these delays and provide accurate delay estimates to the RAKE receiver fingers. The delay estimator 422 is the subject of this invention.

For purposes of presentation we assume, in general, a multipath fading channel with M paths with exact delays $\tau_1, \tau_2, \ldots, \tau_M$. In most solutions we assume that the RAKE receiver has a number of $L \leq M$ correlators to estimate the strongest L paths. Correlator number l is assigned an initial estimated delay $\tau_{l,est}$, corresponding to channel path number l, where $l=1, 2, \ldots$ or L. This initial assignment is performed by the delay searcher block 421 of FIG. 4.

Figure 5:
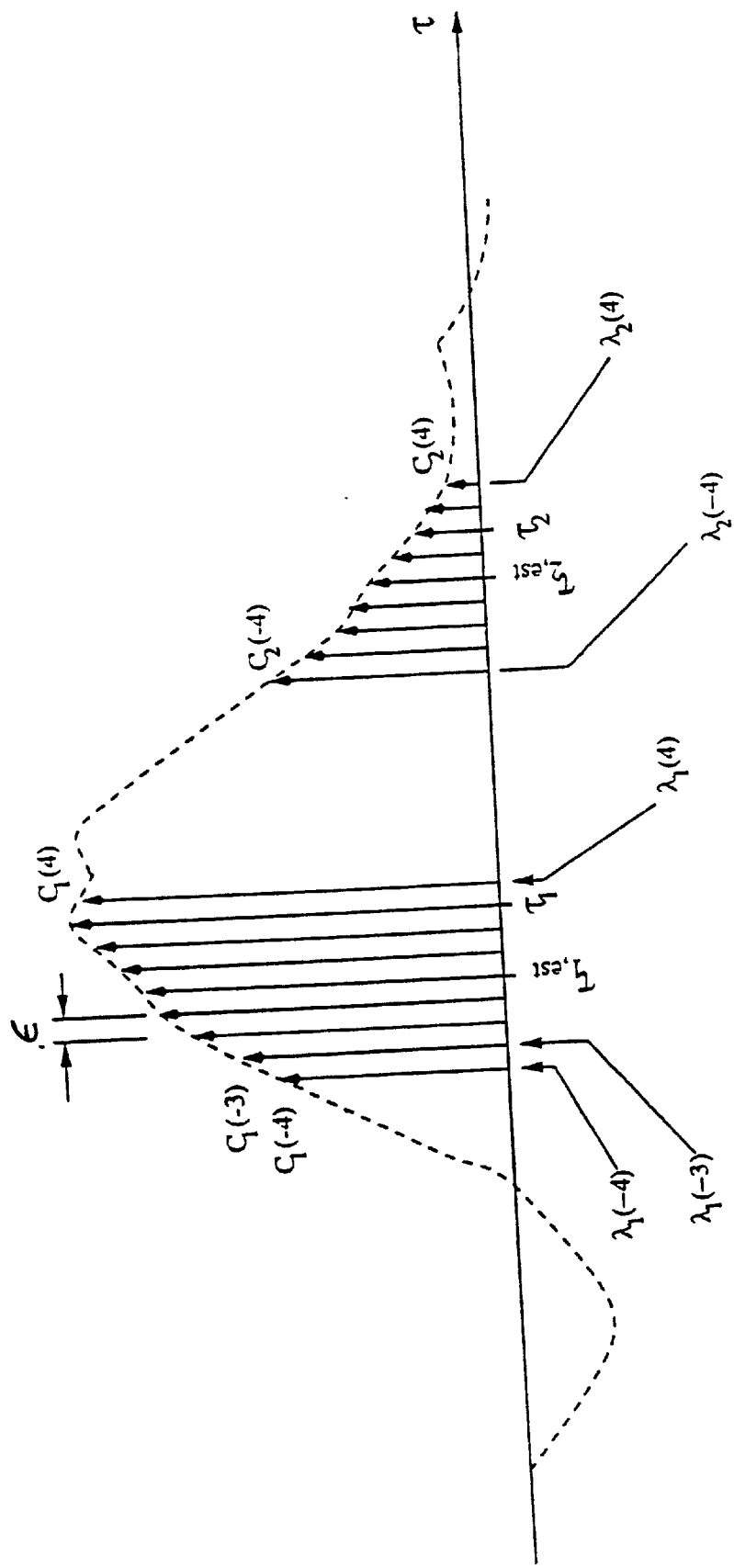
FIG. 5 illustrates correlation results for two correlators in an embodiment of the invention.

Correlator number l performs a number of correlations at delays around $\tau_{l,est}$. For example, it can perform N+1 correlations at delays $\lambda_l(n)=\tau_{1,est}+n\epsilon$, where l=1, 2, ... L, and where $\epsilon$ is a sample period as shown in FIG. 5. In this presentation we assume N is even and n is in the range [−N/2, N/2]. This means that the N+1 correlations are centered by the correlation at the estimated delay, $\tau_{1,est}$. FIG. 5 shows an example of the correlations for the case of L=M=2 and N=8 (i.e., 9 correlations).

Hence, the correlation result $C_l(n)$ is at delay $\lambda_l(n)$ and is performed by correlator number l. Hence, we have (N+1)L correlation results, as shown by vertical arrows in FIG. 5. These correlation results, $C_l(n)$, are stored and processed. In this document we describe embodiments of the invention for processing the correlation results and deducing accurate estimates of the channel delays $\tau_l$, for the strongest L paths, where $1 \leq l \leq L$. Alternatively, we can use the correlation results to find accurate estimates for all channel delays $\tau_l$, where $1 \leq l \leq M$, and use only the L delays that correspond to the strongest L paths for demodulation purposes. The presentation in this document assumes the first case, i.e., $1 \leq l \leq L$.

In a first preferred embodiment, envelope-based estimation is used. For envelope-based estimation, the largest L values of $|C_l(n)|^2$ are successively selected, given that the corresponding delays $\lambda_l(n)$ are separated by a minimum delay separation, which is typically on the order of one chip duration, $T_c$. The corresponding delays $\lambda_l(n)$ are assigned to the L correlators as the new estimations for $\tau_{1,est}$.

Figure 6:
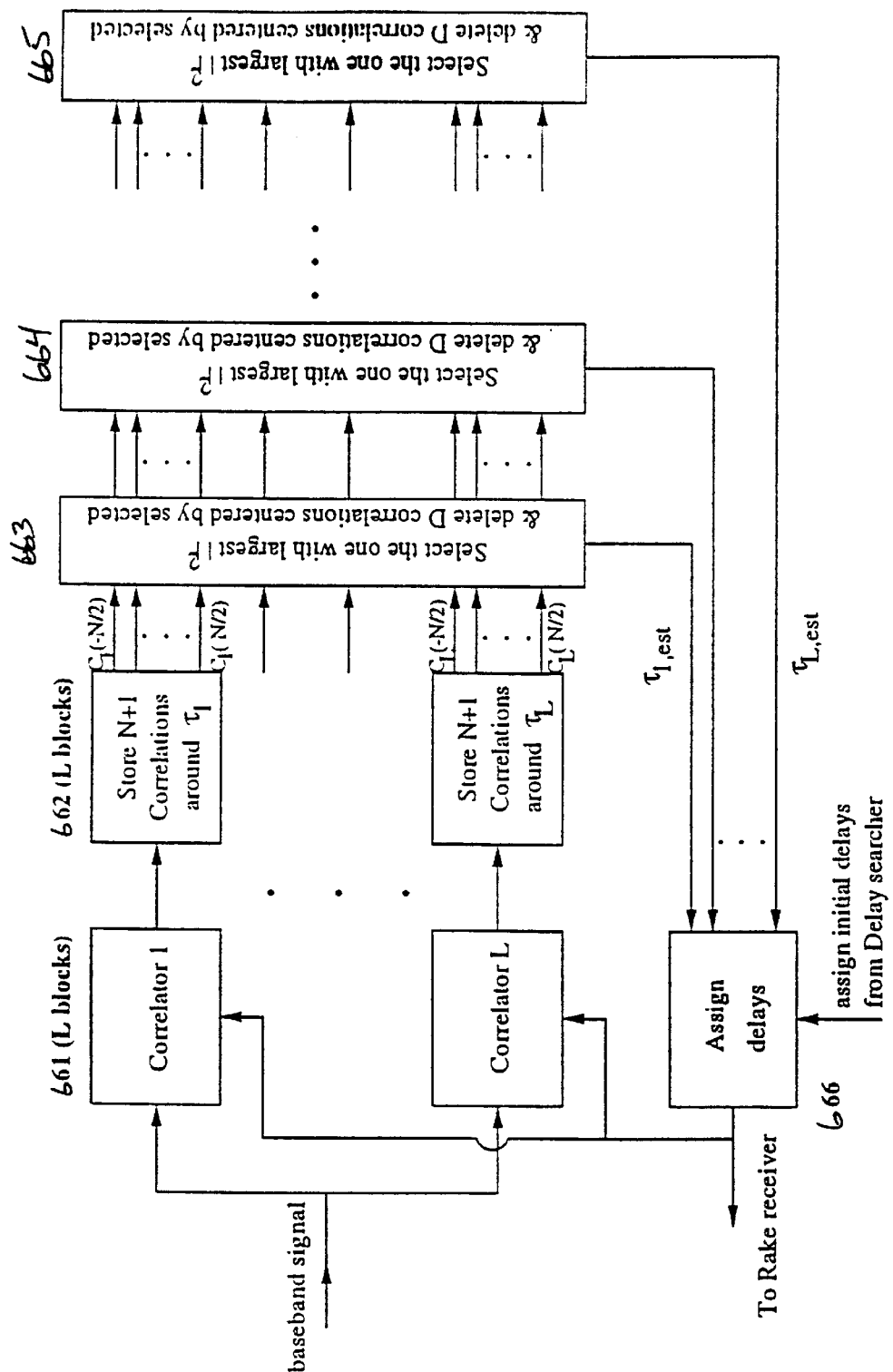
FIG. 6 is a block diagram of a system that performs envelope-based estimation consistent with the invention.

FIG. 6 shows a block diagram of a system that performs these operations. Each block from the L blocks 661 performs N+1 correlations at delays $\lambda_l(n)$ to produce the results $C_l(n)$. These correlation results are stored in blocks 662. Once all correlations are completed, block 663 selects the largest of all $|C_l(n)|^2$, where $1 \leq l \leq L$ and $-N/2 \leq n \leq N/2$, and updates the first (strongest) delay estimate $\tau_{1,est}$ to be equal to the corresponding $\lambda_l(n)$. Also, block 663 deletes (i.e., sets to zero) D correlations centered by the selected value of $\lambda_l(n)$. This guarantees that the next selected delay is at least $D\epsilon/2$ away from the first one, thus preventing the delay estimates from bunching up. For example, the value of $D\epsilon/2$ can be chosen to be equal to a chip period, half a chip period, or another appropriate value. Block 664 repeats the same process performed at block 663 to find the next delay estimate $\tau_{2,est}$. The process is repeated L times until the $L^{th}$ block 665 finds the estimate $\tau_{L,est}$.

The new estimates are fed back to block 666 which assigns them to the RAKE fingers and to the correlator blocks 661. The process is continuously repeated with new correlations, using the new estimates, to provide delay estimations and track the multipath signals. To avoid sudden changes in delay, which adversely impact channel tracking, existing delays can be adjusted to move towards the new delays in one or more steps of size $\epsilon$ per delay update period.

In FIG. 6, the block of L correlators 661 provides the L(N+1) correlations needed. Each correlator can be a simple integrate and dump correlator, so that only one of the N+1 correlations is performed at a time. The correlator can also be a sliding correlator, which produces the N+1 correlations much faster. Finally, the block of L correlators 661 can be replaced by a single sliding correlator, that produces correlations in a window spanning N/2 samples before the earliest arriving ray to N/2 samples after the latest arriving ray. In this case, the selection devices 663, 664 and 665 have a contiguous set of correlations to work with, instead of a set of L, possibly noncontiguous subsets of N+1 correlations. Use of a single, sliding correlator applies to all subsequent embodiments as well.

Zeroing D correlations effectively keeps the associated D delay values from being considered. An alternative approach would be to not zero the correlation values, but to perform a search for largest correlation values over a subset of the correlation values. The subset would exclude those delay values center around previously selected values.

A second preferred embodiment uses envelope-based estimation with subtraction. For envelope-based estimation with subtraction, known characteristics of the correlation function between the transmitted signal and the local PN code are used. The correlation function is preferably the chip pulse shape autocorrelation function or the response of the transmit and receive filters collectively. It may also include the effects of the spreading code. The correlation function is a form of side information. Side information is information which aids the delay estimation process. In a multipath fading channel, each path in the channel generates one of the correlation functions. The correlation functions of all the paths interfere with each other. As described above, FIG. 2 shows an example of correlation functions in a two path fading channel. Each individual path generates a correlation function that is similar in shape to the one shown in FIG. 1 for a single path channel. However, in reality the two paths interfere with each other and the net correlation function is shown by a dashed line in FIG. 2. Although the shape of the correlation function for one path is known in advance, the net correlation function is not known in advance since it depends on the path delays and gains, which are not known in advance.

Figure 1:
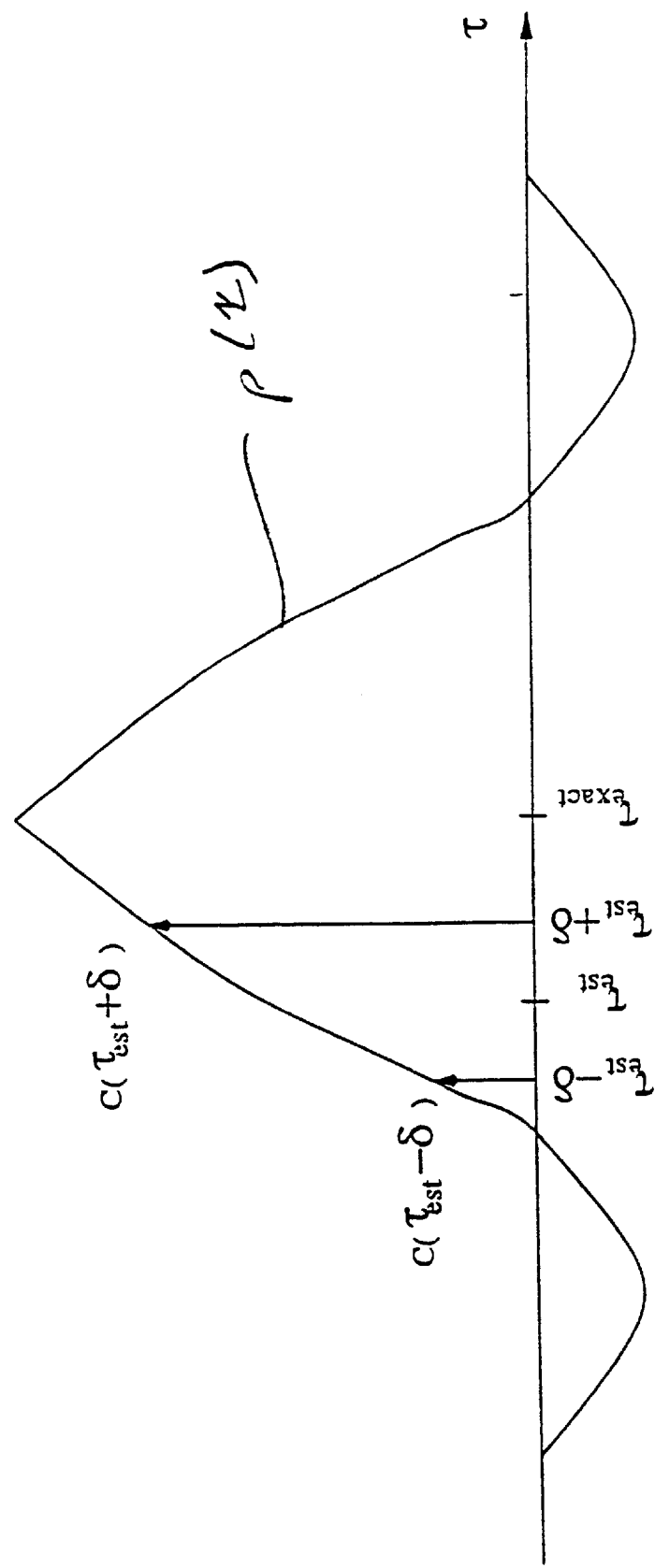
FIG. 1 illustrates a correlation function corresponding to a single path channel.
Figure 2:
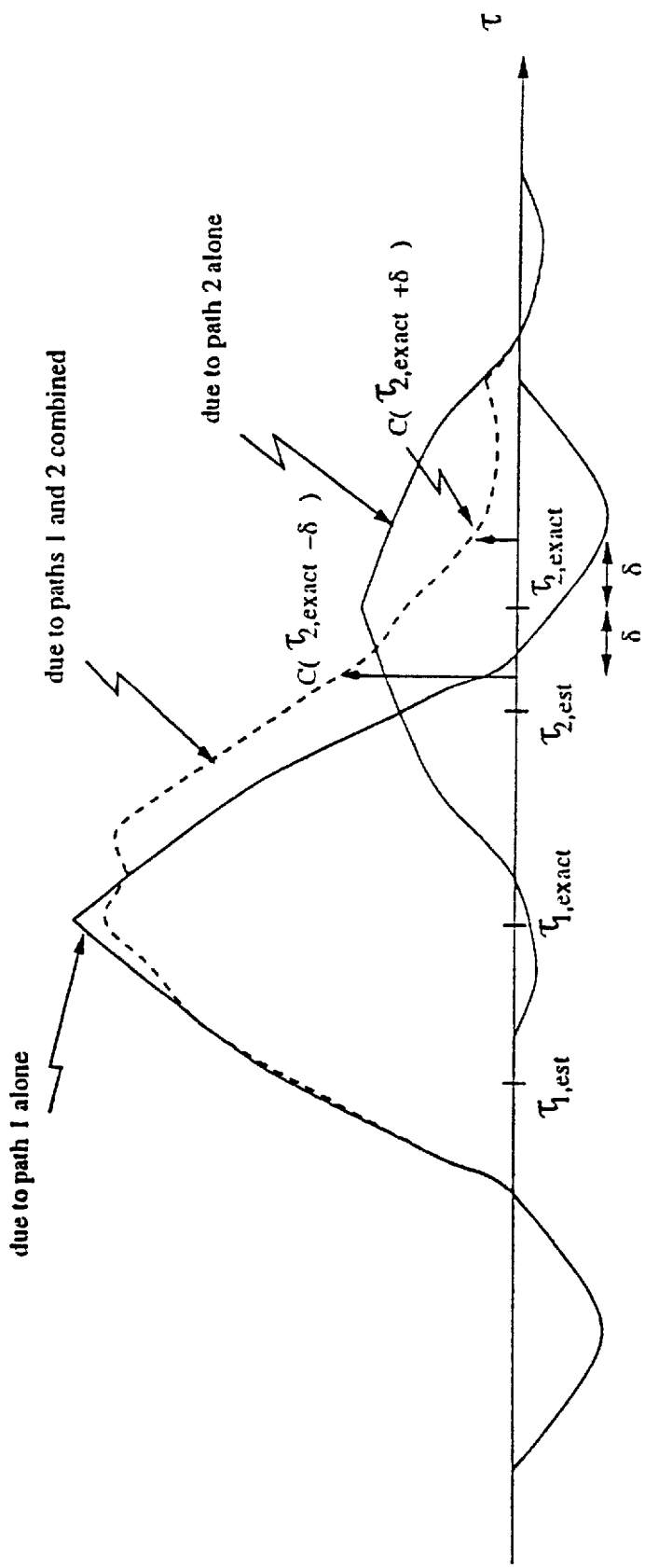
FIG. 2 illustrates correlation functions corresponding to a dual path fading channel.

A goal of this embodiment is to exploit the knowledge of the shape of the correlation function for each individual channel path, to remove the inter-path interference. Inter-path interference is interference that correlator number l receives due to other paths, i.e., paths $\neq$l. Let the correlation function between the received DS-SS signal and the local PN code, if the channel has only one path with unity gain, be denoted as $p(\tau)$. This $p(\tau)$ is shown in FIG. 1 and is known in advance, or is estimated when only one path is present.

Figure 7:
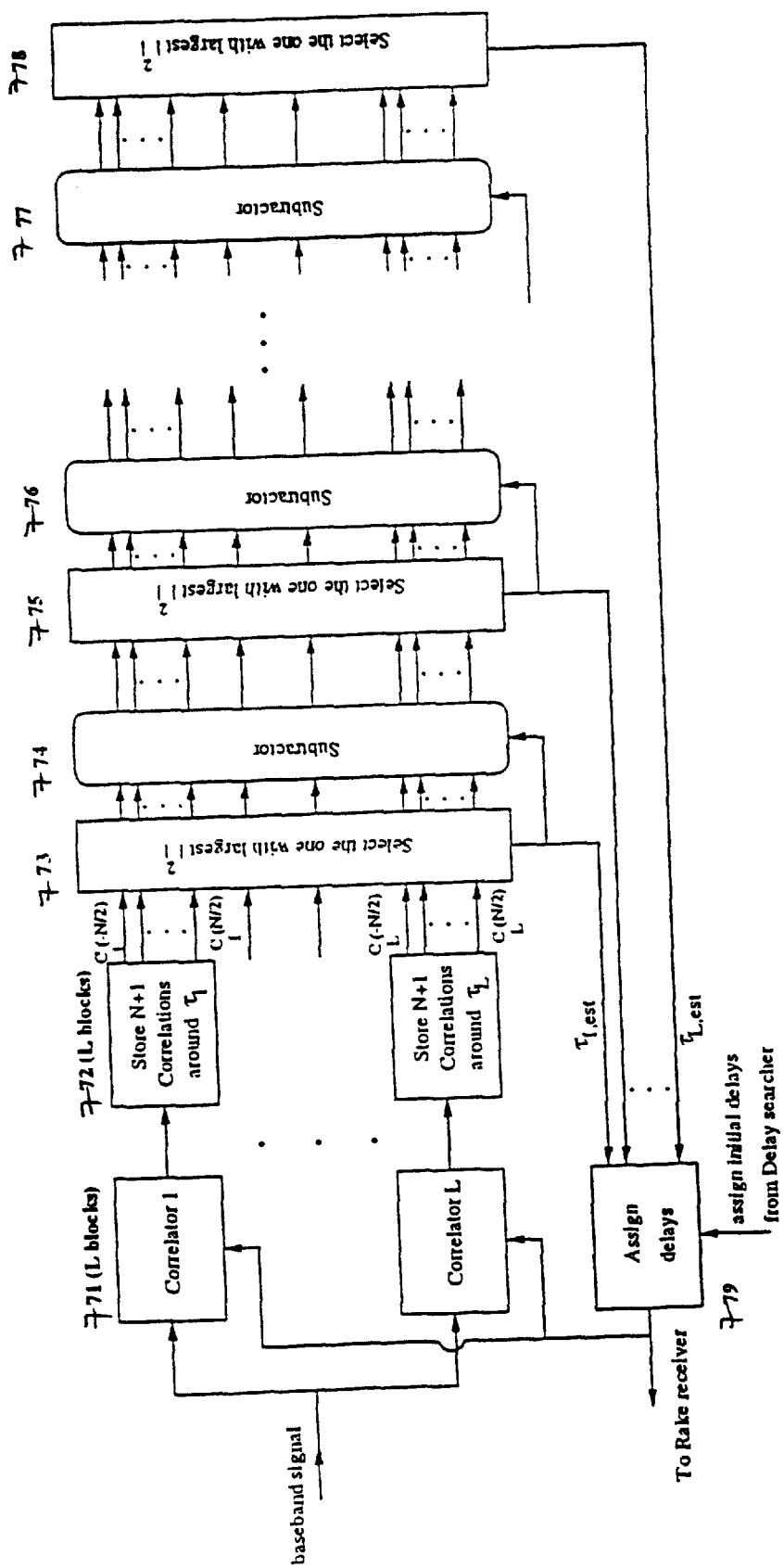
FIG. 7 is a block diagram of a system that performs envelope-based estimation with subtraction, consistent with the invention.

The procedure in this method is as follows:
1. Referring to FIG. 7, blocks 771 and 772 perform the same function of blocks 661 and 662 in FIG. 6 to find $C_l(n)$ for each delay $\lambda_l(n)$. However, the deletion of D correlations is not done.
2. Also as in the first embodiment, block 773 finds the largest of $|C_l(n)|^2$ and the corresponding delay $\lambda_l(n)$. This delay is used as the first estimate and is denoted as $\tau_{1,est}$. The corresponding correlation value is denoted as $C_{1,est}$. For example, and referring to FIG. 5, $|C_1(3)|^2$ is the largest. Accordingly, $\tau_{1,est}=\lambda_1(3)$ and $C_{1,est}=C_1(3)$.
3. We assume that this first estimate is exact, and use it to subtract the one path correlation function effect from all other correlation results. Hence, we perform the subtraction:

$$C_l(n)|_{new}=C_l(n)|_{old}-C_{1,est}p[\lambda_l(n)-\tau_{1,est}]$$

for all calculated correlation values $C_l(n)$ for all values of l and n. For example since the first estimate was the pair $C_{1,est}=C_1(3)$ and $\tau_{1,est}=\lambda_1(3)$, we subtract the function $C_1(3)p\,[\lambda_l(n)-\lambda_1(3)]$ from all calculated correlation values $C_l(n)$ for all values of l and n. This way, and referring back to FIG. 2. we are trying to subtract the correlation function due to path 1, which is the strongest path, from the net correlation function, shown by dashed line. If the first estimate is exact, subtraction is performed in the exact location with the exact weight and the remainder will be the correlation function of path 2. Since the first estimate is made using the strongest path, the first estimate has a high probability of being correct.

4. After the first subtraction at block 774, at block 775 the largest $|C_l(n)|^2$ is selected again, and the corresponding delay $\lambda_1(n)$ is found. Say for example that $|C_2(1)|^2$ is the largest. Then the second estimate is declared to be $\tau_{2,est}=\lambda_2(1)$ and the corresponding correlation results $C_{2,est}=C_2(1)$.

5. Then, in block 776 the following subtraction is performed:

$$C_l(n)|_{new}=C_1(n)|_{old}-C_{2,est}p[\lambda_l(n)-\tau_{2,est}]$$

This subtraction is performed for all correlation results $C_l(n)|_{old}$ (which have already undergone a first subtraction) for all values of:

$$1 \leq l \leq L \text{ and } -N/2 \leq n \leq N/2$$

6. The process is repeated using the blocks following block 776, until in block 779 the L selected delays $\lambda_f(n)$ are assigned to the correlators as the new estimated values $\tau_{1,est}$. After estimating all L paths the process is continuously repeated with new correlations to provide delay estimations and track the multipath signals.

A third preferred embodiment uses envelope-based estimation with subtraction and iteration. In this method one of the previous methods or any other method of estimation, is applied first to make an initial estimate of all the L delays. However, these delays are not assigned by blocks 666 or 779 to the RAKE fingers or the correlators yet. Instead, the original, unsubtracted correlation results $C_l(n)$ are iteratively used for more iterations of subtractions to improve the delay estimates before assigning them to the RAKE fingers and the correlators.

Figure 8:
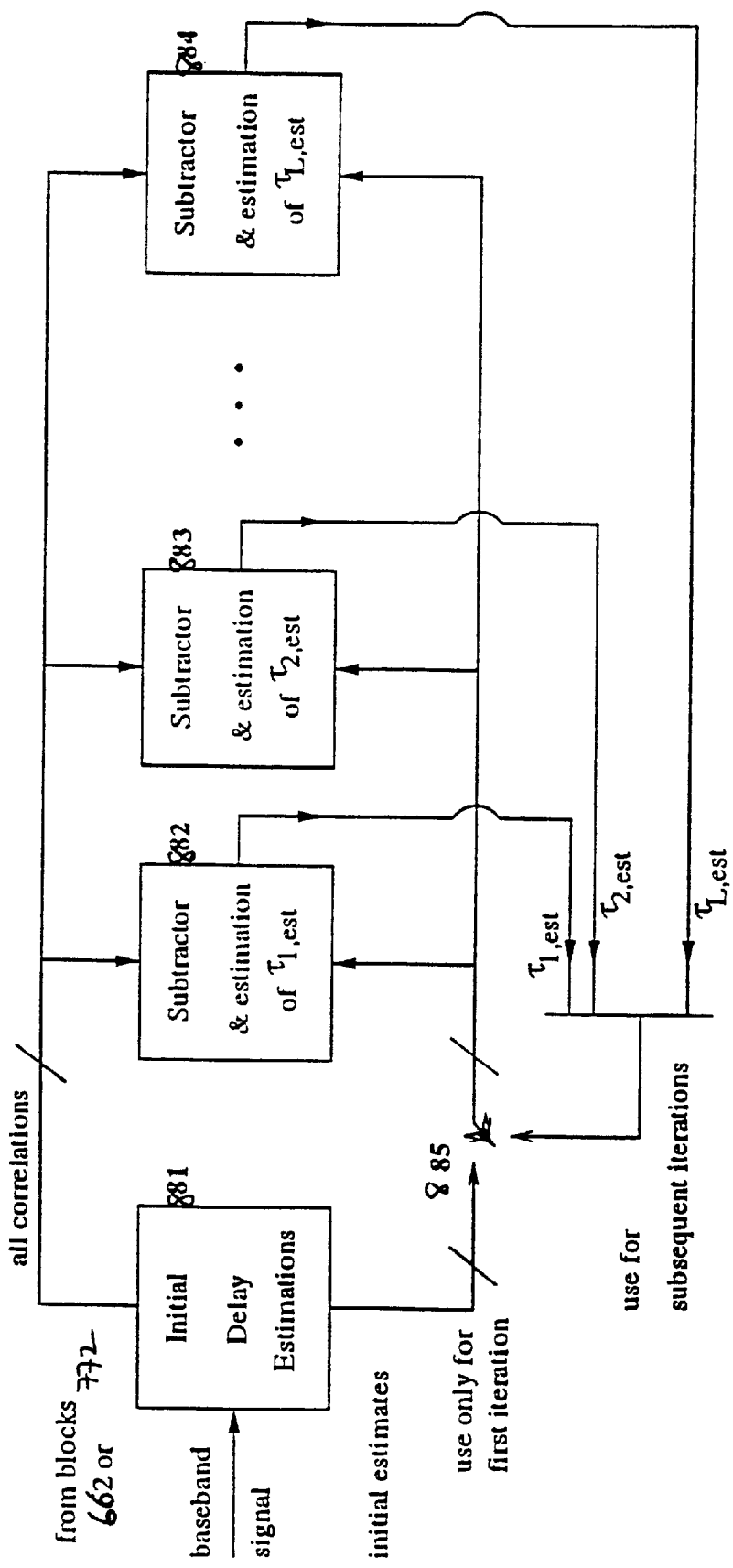
FIG. 8 is a block diagram of a system that performs envelope-based estimation with subtraction and iteration, consistent with the invention.

Referring to FIG. 8, the iteration process is as follows:

1. All the original, unsubtracted correlation results $C_l(n)$ are stored. These will be denoted here as $C_l(n)|_{orig}$. This is done in block 881. Block 881 can represent any delay estimation approach. A copy of the correlation results, $C_l(n)|_{orig}$ is delivered and stored in each of blocks 882, 883, ... to 884, so that each block has its own copy. Also, initial delay estimates $\tau_{1,est}$ and the corresponding correlation results $C_{1,est}$ for $1 \leq l \leq L$ are generated using one of the previous methods (or the prior art methods).

2. Switch 885 is first set to the upper connection and the initial delay estimates are delivered to blocks 882, 883, ... to 884 as starting values for iterations. Afterwards, switch 885 is set to the lower position.

3. Each of the L blocks 882, 883, ... to 884 is used to re-estimate the delay for one path. For each block used to re-estimate a corresponding path number f (in block 882 f=1 while in block 883 f=2, and so on), the following subtraction is performed to re-estimate the delay $\tau_{f,est}$ of path number f. The subtraction is performed using all the original correlation results $C_l(n)|_{orig}$ stored in the block, for all values of $1 \leq l \leq L$ and $-N/2 \leq n \leq N/2$.

$$C_l(n)|_{new} = C_l(n)|_{orig} - \sum_{k=1,k \neq f}^{L} C_{k,est}p[\lambda_l(n) - \tau_{k,est}]$$

This is done in all blocks simultaneously. In effect, this subtraction process cancels or removes interference with path f caused by the other paths, i.e., all paths $\neq$f. A copy of the original, unsubtracted values of $C_l(n)|_{orig}$ is also retained.

4. After subtraction, the largest value of the updated $|C_f(n)|_{new}|^2$ is found, and its corresponding delay $\lambda_f(n)$ is selected as a new estimation for $\tau_{f,est}$. This process is done in blocks 882 to 884 for all values of $1 \leq f \leq L$.

5. The new estimates are fed back through switch 885 and the same procedure is repeated again many times to improve the estimation. The subtraction is always performed on the original values of $C_l(n)|_{orig}$ kept in memory.

For example, let L=3 and let the estimated delays from the previous method be $\tau_{1,est}$ and $\tau_{2,est}$ and $\tau_{3,est}$. To improve the estimation of $\tau_{1,est}$, i.e., f=1, we perform the following subtraction on $C_l(n)$:

$$C_l(n)|_{new}=C_l(n)|_{orig}-C_{2,est}p[\lambda_l(n)-\tau_{2,est}]-C_{3,est}p[\lambda_l(n)-\tau_{3,est}]$$

from all original correlation values $C_l(n)|_{orig}$ for all values of l and n. This process subtracts the interference caused by channel paths 2 and 3. Then, the largest value of $|C_l(n)|_{new}|^2$ is found, and its corresponding delay $\lambda_l(n)$ is selected as a new estimation for $\tau_{1,est}$. Similar subtraction is performed simultaneously for the second and the third delays. The new delay estimates can be used for more iterations of subtraction to further improve the estimates.

In a fourth preferred embodiment of the invention we find delays that minimize a metric, such as a mean square error between the correlation values and a weighted, delayed summation of the correlation function $p(\tau)$. In general, a metric is a cost function that provides performance measures for different solutions to a particular problem. Thus, a metric can be evaluated to determine a solution that satisfies a specific performance level or characteristic.

Figure 9:
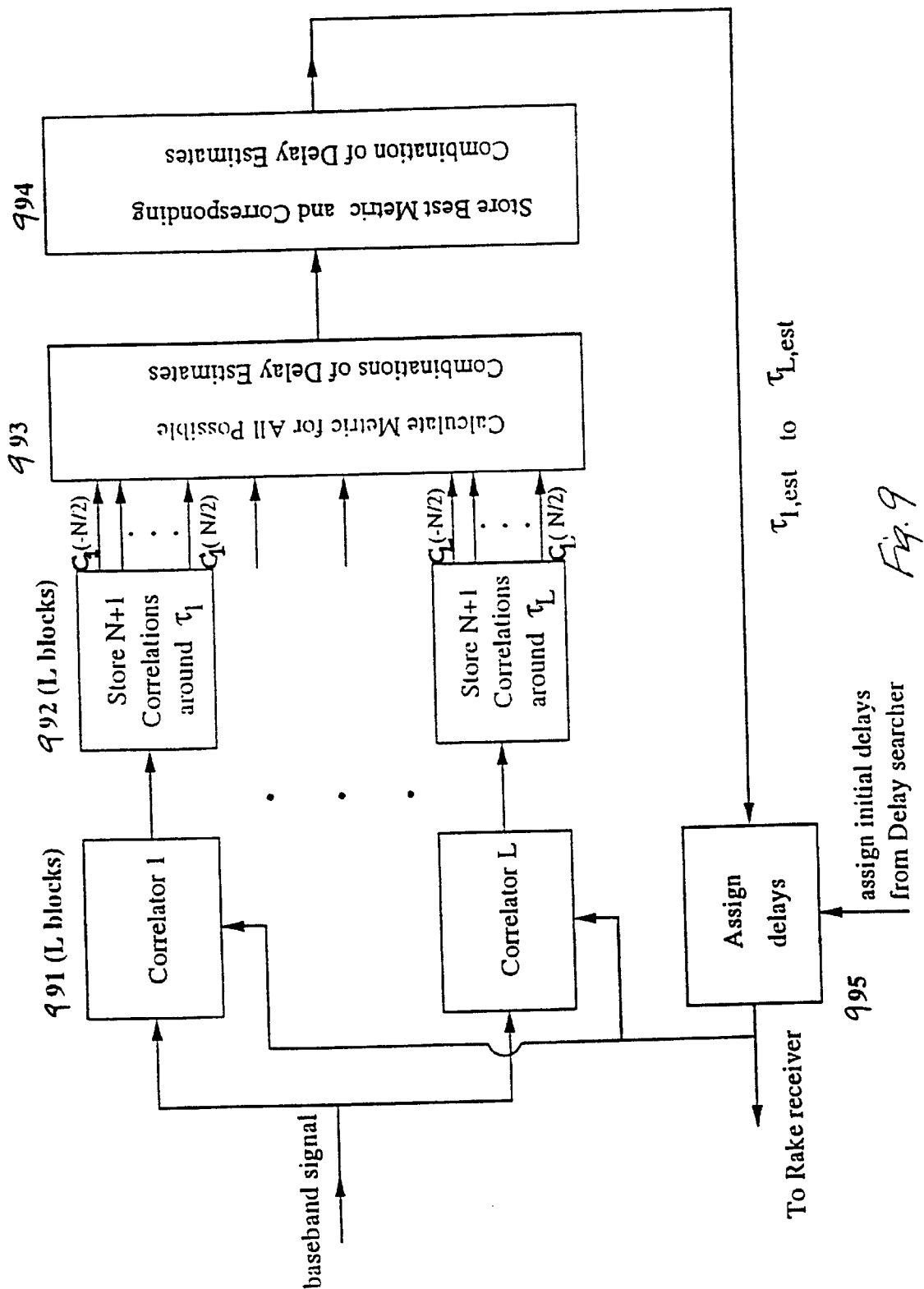
FIG. 9 is a block diagram of a system that performs metric-based delay estimation, consistent with the invention.

Referring to FIG. 9, blocks 991 and 992 perform the same functions as blocks 661 and 662 of FIG. 6 and blocks 771 and 772 of FIG. 7. For each of the L correlators there are N+1 candidate delays where correlation results are generated. Hence, there is a total of (N+1)L possible candidate delay combinations. For each combination, block 993 calculates a metric that represents the squared error between the correlation values and weighted, delayed summation of the correlation functions. Block 994 stores the best metric, which is the smallest metric in this case. After calculating the metric for all possible combinations, block 994 will retain only the smallest metric and the corresponding combination of delays. These delays are delivered to block 995. Block 995 assigns the delays to the RAKE receiver and the correlator blocks 991 to generate new (N+1)L correlations.

For example, assume L=3. An objective is to find the combination of j, k, and m that minimizes the metric J:

$$J(j,k,m) = \sum_{l=1}^{L} \sum_{n=-\frac{N}{2}}^{\frac{N}{2}} |C_l(n) -$$

$$\{C_1(j)p[\lambda_l(n) - \lambda_1(j)] + C_2(k)p[\lambda_l(n) - \lambda_2(k)] + C_3(m)p[\lambda_l(n) - \lambda_3(m)]\}|^2$$

where $-N/2 \leq j \leq N/2$, $-N/2 \leq k \leq N/2$ and $-N/2 \leq m \leq N/2$. This metric is calculated for all combinations of j, k and m in block 993. Block 994 retains only the combination of j, k, and m that minimizes the metric. Let the selected combination be denoted as $\hat{j}$, $\hat{k}$ and $\hat{m}$ then the delay estimates generated by block 994 are $\tau_{1,est}=\lambda_1(\hat{j})$, $\tau_{2,est}=\lambda_2(\hat{k})$ and $\tau_{3,est}=\lambda_3(\hat{m})$.

For a general value of L the metric described above can be extended appropriately. Note, since each of j, k and m takes values from $-N/2$ to $N/2$, the same metric is computed $(N+1)^L$ times.

As with previous approaches, the calculations need not operate on L possibly noncontiguous subsets of correlation values. Alternatively, the approach can be applied to a window of contiguous correlation values or even multiple windows. For the single window of K samples, there would be K!/(L!(K−L)!) possible combinations of L delays, where "!" denotes factorial (e.g., 4!=4×3×2×1). To reduce complexity it may be desirable to use another delay estimation technique to obtain initial delay estimates, then consider only delays that fall near the initial set.

Figure 10:
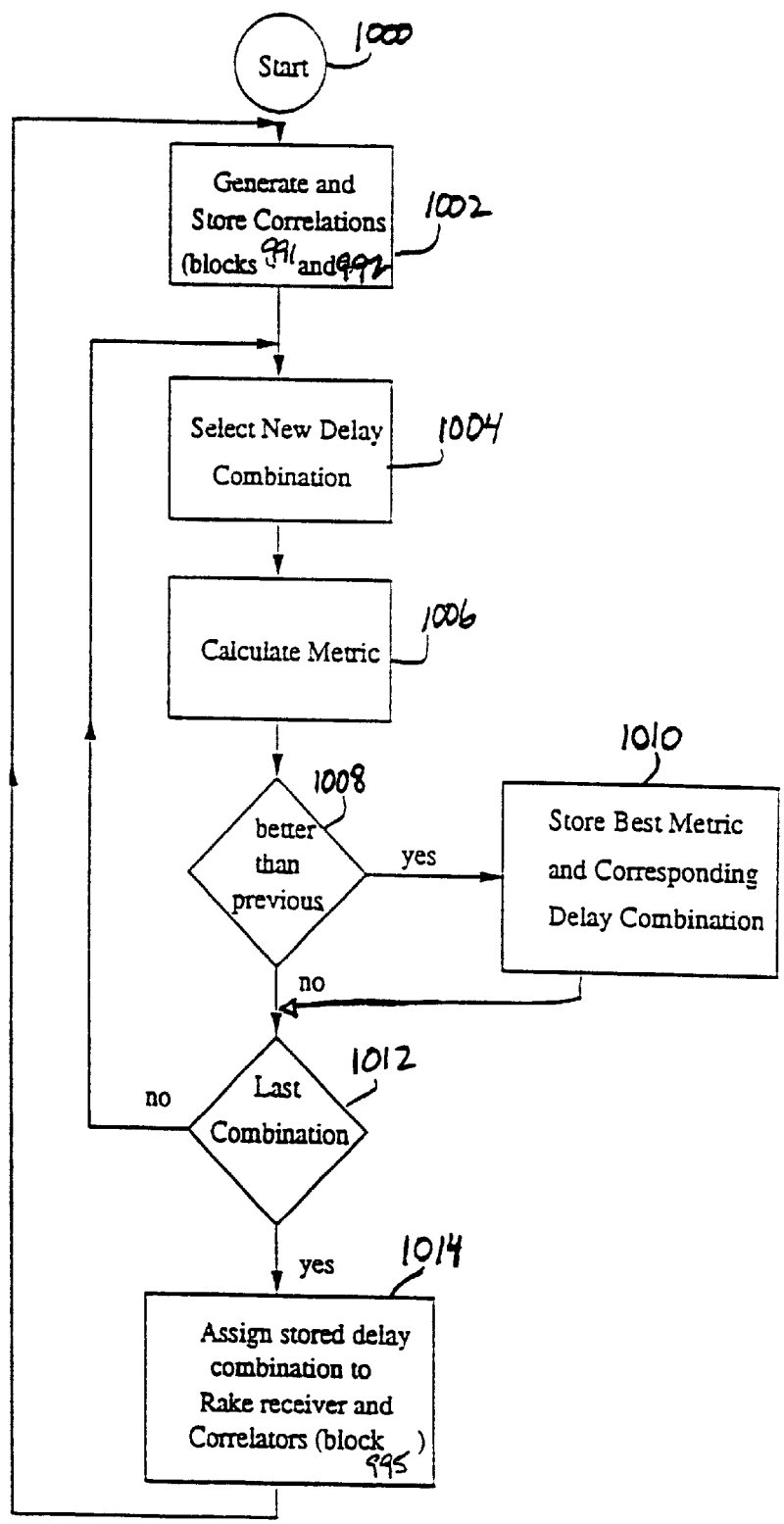
FIG. 10 illustrates a process for performing metric-based delay estimation, consistent with the invention.

FIG. 10 shows a flow chart of the process described above, which can take place for example within the baseband processor 402 of FIG. 3, and more particularly in the delay estimator 422 of FIG. 4. In FIG. 10, the process begins at step 1000 and proceeds to step 1002. In step 1002, correlation values are generated and stored. From step 1002 the process proceeds to step 1004, where a new delay combination is selected. From step 1004 the process proceeds to step 1006, where a metric is calculated for the delay combination selected. From step 1006 the process proceeds to step 1008, where it is determined whether the calculated metric is better than a previously calculated and stored metric. If the newly calculated metric is better than the stored metric, then the process proceeds from step 1008 to step 1010, where the newly calculated metric and the corresponding delay combination are stored. From step 1010 the process proceeds to step 1012. If the newly calculated metric is not better than the stored metric, then the process proceeds from step 1008 to step 1012. In step 1012 it is determined whether the metric most recently calculated was for the last possible candidate delay combination. If not, then the process returns to step 1004. If yes, then the process proceeds from step 1012 to step 1014. In step 1014 the stored delay combination corresponding to the best metric is assigned to the RAKE receiver and the correlator blocks 991. From step 1014 the process proceeds to step 1002, and the cycle repeats.

In a fifth preferred embodiment, the amount of computation required to compute the metric is reduced by performing the computation iteratively using, for example, MMSE estimation. In this method, and referring to FIG. 11, we have L different metrics to minimize. Each metric is used to estimate the delay of one path. Blocks 1111 and 1112 correspond to blocks 991 and 992 of FIG. 9, and perform similar functions. Block 1113 applies the first metric L(N+1) times, corresponding to the N+1 delays in the L correlators (blocks 1111). Block 1114 stores the best metric and the corresponding delay. This delay is the first estimate. The process is repeated L times in blocks 1115 through 1118 with a different metric for each stage.

For example, consider L=3. Block 1113 evaluates the first metric for (N+1)L combinations corresponding to values of f and j, where $1 \leq f \leq L$ and $-N/2 \leq j \leq N/2$. These values of f and j are used to scan all possible delays $\lambda_f(j)$ and minimize the metric:

$$J_1(f, j) = \sum_{l=1}^{L} \sum_{n=-\frac{N}{2}}^{\frac{N}{2}} |C_l(n) - C_f(j)p[\lambda_l(n) - \lambda_f(j)]|^2$$

Block 1114 selects the combination of f and j that minimizes this metric. Let the selected combination be $\hat{f}$ and $\hat{j}$, which corresponds to the first delay estimate. Then the metric is extended and block 1115 evaluates it for the values of h and k, where $1 \leq h \leq L$ and $-N/2 \leq k \leq N/2$, except for the selected combination corresponding to the first delay estimate. These values of h and k are used to scan all possible delays $\lambda_h(k)$ and minimize the metric:

$$J_2(h, k) = \sum_{l=1}^{L} \sum_{n=-\frac{N}{2}}^{\frac{N}{2}} |C_l(n) - \{C_{\hat{f}}(\hat{j})p[\lambda_l(n) - \lambda_{\hat{f}}(\hat{j})] + C_h(k)p[\lambda_l(n) - \lambda_h(k)]\}|^2$$

Block 1116 selects the combination of h and k that minimizes this metric. Let the selected combination be $\hat{h}$ and $\hat{k}$, which corresponds to the second delay estimate. Then the metric is extended and block 1117 evaluates it for the values of s and m, where $1 \leq s \leq L$ and $-N/2 \leq m \leq N/2$, except for the selected combinations corresponding to the previous delay estimates. These values of s and m are used to scan all possible delays $\lambda_s(m)$ and minimize the metric:

$$J_3(s, m) = \sum_{l=1}^{L} \sum_{n=-\frac{N}{2}}^{\frac{N}{2}} |C_l(n) - \{C_{\hat{f}}(\hat{j})p[\lambda_l(n) - \lambda_{\hat{f}}(\hat{j})] + C_{\hat{h}}(\hat{k})p[\lambda_l(n) - \lambda_{\hat{h}}(\hat{k})] + C_s(m)p[\lambda_l(n) - \lambda_s(m)]\}|^2$$

Block 1118 selects the combination of s and m that minimizes this metric. Let the selected combination be $\hat{s}$ and $\hat{m}$. Hence, the final delay estimates are $\tau_{1,est}=\lambda_{\hat{f}}(\hat{f})$, $\tau_{2,est}=\lambda_{\hat{h}}(\hat{k})$ and $\tau_{1,est}=\lambda_{\hat{f}}(\hat{m})$. These delay estimates are assigned by block 1119 to the RAKE receiver and the correlators block Ill to generate new correlations.

The reduction of computational complexity depends on how the delays are restricted. In the previous description, delays are not allowed to be identical. With this restriction, the number of metrics computed is:

$$L(N+1)+[L(N+1)-1]+ \ldots +[L(N+1)-L+1]=L^2(N+1)-L(L-1)/2$$

However, the first L(N+1) metrics are simpler than the next L(N+1)−1 metrics, and so on. Further restriction is possible, by requiring that in each of the L intervals of length N+1 there be only one delay estimate. For this case, the number of metrics computed is:

$$L(N+1)+(L-1)(N+1)+ \ldots +(N+1)=L(L+1)(N+1)/2$$

Again, the metrics have different complexity. Note that common terms between metrics can be stored in memory and re-used. Also, for a general value of L, the metrics described above are extended appropriately.

Figure 12:
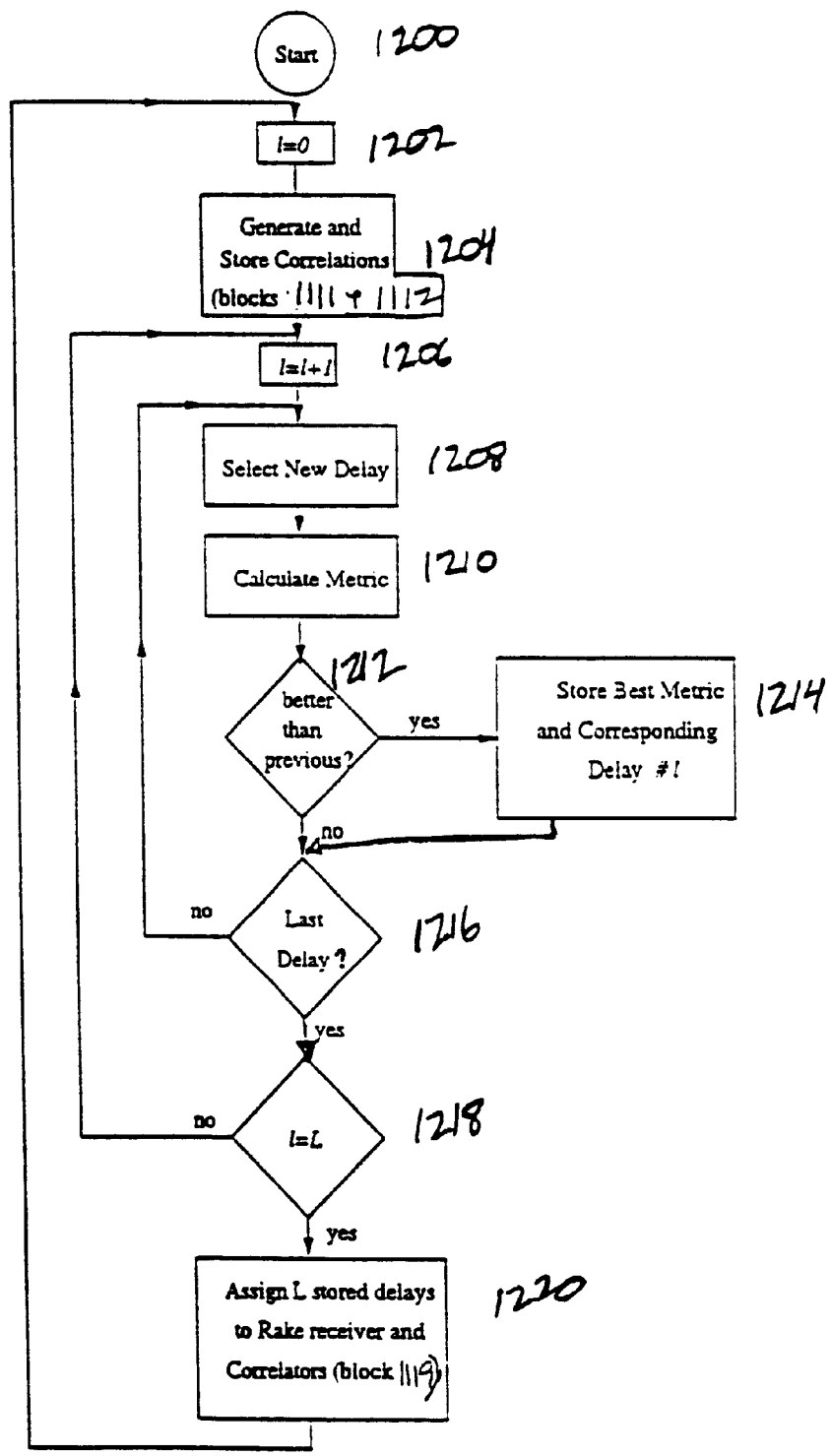
FIG. 12 illustrates a process for performing iterative metric-based delay estimation, consistent with the invention.

FIG. 12 shows a flow chart of the process described above, which can take place for example within the baseband processor 402 of FIG. 3, and more particularly in the delay estimator 422 of FIG. 4.

In FIG. 12, the process begins at step 1200 and proceeds to step 1202, where l is set to zero. The value of l denotes a particular one of the L metrics. From step 1202 the process proceeds to step 1204, where correlation values are generated and stored. From step 1204 the process proceeds to step 1206, where l is incremented to indicate a next one of the L metrics. In this instance l equals one to indicate the first of the L metrics. From step 1206, the process proceeds to step 1208, where a new delay estimate is selected for the metric, which depends on new and previous delay estimates. From step 1208 the process proceeds to step 1210, where the metric is calculated. From step 1210 the process proceeds step 1212, where it is determined whether the newly calculated metric is better than the previously calculated metric. If not, then the process proceeds to step 1216. If yes, then the process proceeds to step 1214, where the best metric and the corresponding delay are stored. From step 1214, the process proceeds to step 1216, where it is determined whether the delay is the last possible delay for the metric. If not, then the process proceeds to step 1208 where a new delay is selected for the metric. If yes, then the process proceeds to step 1218 where it is determined whether the metric is the last one of the L metrics. If not, then the process proceeds to step 1206, where l is incremented to select the next metric. If yes, then the process proceeds to step 1220, where the L stored delay estimates, i.e., the best delays for each of the L metrics, are assigned to the RAKE receiver and the correlators. From step 1220, the process proceeds to step 1202, and repeats.

In describing FIGS. 9–12, a MMSE metric is used. Alternatively, maximum likelihood estimation can be used to find the most likely delay values given the received samples and an assumption that the noise (interference plus thermal noise) is Gaussian. In essence, a loglikelihood function of the received data is maximized. Byproducts of this approach include maximum likelihood (ML) channel coefficient estimates, which can be used to initialize a channel coefficient estimator.

Figure 13:
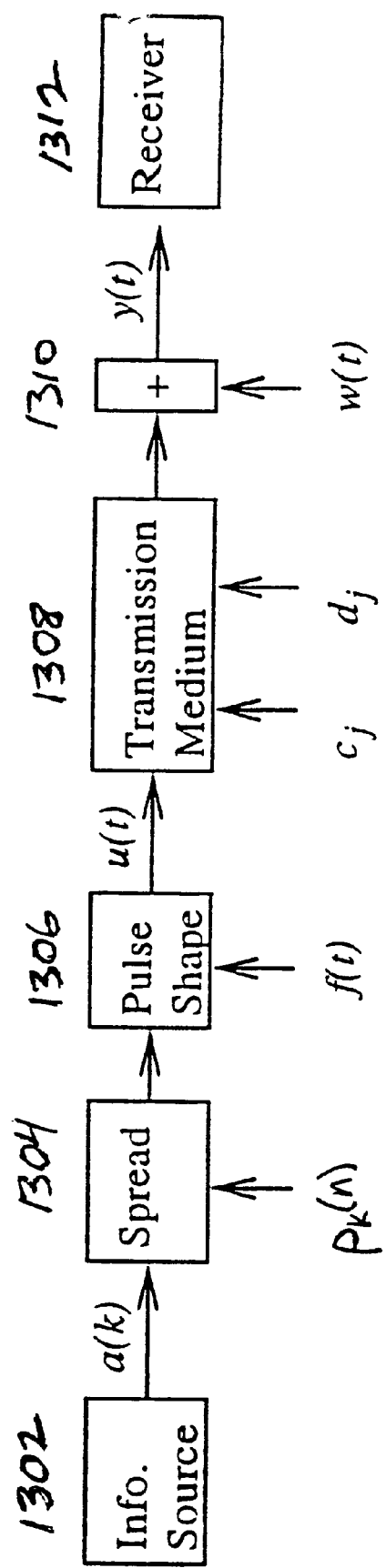
FIG. 13 is a block diagram signal model of a maximum likelihood estimation system, consistent with the invention.

The signal model is illustrated in FIG. 13. The general case is illustrated, in which the signal being used to estimate the channel has data modulation a(k). Note that a(k) is known for pilot channels or pilot symbols, whereas a(k) would need to be detected for a data channel. Per survivor processing techniques can be used, so that for a data channel, a(k) is hypothesized. The spreading sequence is denoted $p_k(n)$, the chip pulse shape is denoted f(t), and the baseband equivalent transmitted waveform is denoted u(t). The medium is modeled as a finite set of rays or resolvable multipaths, with delays $d_j$ and coefficients $c_j$. Noise is denoted w(t) and the received signal is denoted y(t).

As shown in the signal model of FIG. 13, an information source having data modulation a(k) is provided in block 1302, and is spread in block 1304 with the spreading sequence $P_k(n)$ and then provided to block 1306. In block 1306, the spread signal is processed using the pulse shape f(t) to generate the baseband equivalent transmitted waveform u(t) which is then transmitted through a transmission medium 1308. The transmission medium is modeled as described above with delays $d_j$ and coefficients $c_j$. Noise w(t) is introduced into the signal in block 1310, and finally the signal is received by a receiver in block 1312.

We assume data corresponding to K symbol values is used to estimate or update the delays (K=1 typically). Maximizing the likelihood is equivalent to maximizing the following loglikelihood function:

$$J(\{\hat{c}_j, \hat{d}_j\}) = \int -|y(t) - \hat{y}(t)|^2 dt \quad (1)$$

where $$\hat{y}(t) = \sum_{k=1}^{K} a(k) \sum_{n} p_k(n) \sum_{j} \hat{c}_j f(t - nT_c - \hat{d}_j - kN_c T_c) \quad (2)$$

where $N_c$ is the number of chips per symbol. This cost function or metric can be expressed in terms of quantities available to the baseband processor by assuming:

1. filtering in the RF and possibly baseband sections closely approximates filtering that is matched to the pulse shape f(t); and 2. despreading is matched to the spreading sequence $p_k(n)$.

The delay estimation relies on despread values $x_k(t)$, where t is sampled, for example, 8 times per chip period. These despread values are obtained by correlating the baseband samples r(n) with the conjugate of the spreading code, $p_k^*(n)$, i.e.

$$x_k(\hat{d}_j) = \sum_n p_k^*(n) r(nT_c + kN_c T_c + \hat{d}_j) \quad (3)$$

Under the above assumptions, it can be shown that the metric given above is equivalent to the metric:

$$J(\{\hat{c}_j, \hat{d}_j\}) = \quad (4)$$

$$2 \sum_j \left\{ \hat{c}_j^* \sum_{k=1}^{K} a(k) x_k(\hat{d}_j) \right\} - KN_c \sum_j \sum_{j'} \hat{c}_j^* \hat{c}_{j'} r_{ff}(\hat{d}_j - \hat{d}_{j'})$$

where channel coefficient estimates are a function of the delay estimates and the pulse shape autocorrelation function $r_{ff}(\tau)$. Specifically, $$R\hat{c} = x \quad (5)$$

where $$R = \begin{bmatrix} r_{ff}(0) & r_{ff}(\hat{d}_1 - \hat{d}_2) & r_{ff}(\hat{d}_1 - \hat{d}_3) & \ldots \\ r_{ff}(\hat{d}_2 - \hat{d}_1) & r_{ff}(0) & r_{ff}(\hat{d}_2 - \hat{d}_3) & \ldots \\ r_{ff}(\hat{d}_3 - \hat{d}_1) & r_{ff}(\hat{d}_3 - \hat{d}_2) & r_{ff}(0) & \ldots \\ \ldots & \ldots & \ldots & \ldots \end{bmatrix} \quad (6)$$

$$\hat{c} = [\hat{c}_0 \ldots \hat{c}_{J-1}]^T \quad (7)$$

$$x = \left[ \frac{1}{K} \sum_{k=1}^{K} a^*(k) x_k(\hat{d}_0) \ldots \frac{1}{K} \sum_{k=1}^{K} a^*(k) x_k(\hat{d}_{J-1}) \right]^T \quad (8)$$

Thus, candidate delay estimates would be considered. For each candidate set, channel coefficient estimates would be determined and the metric would be evaluated. The candidate estimates which maximize the metric would become the estimated delays. This is shown in FIGS. 9 and 10, except the metric is the ML metric.

Alternative forms of the metric are possible. For example, the channel coefficient estimation expression could be substituted into the metric expression to obtain a metric that depends only on the correlation values and the pulse shape autocorrelation function. Also, the pulse shape autocorrelation function can be pre-computed and stored in memory.

In practice, coarse or initial delay estimates can be obtained by other approaches. Then, candidate delay estimates can be formed by searching about the initial estimates, so that there aren't too many candidates to consider.

Figure 11:
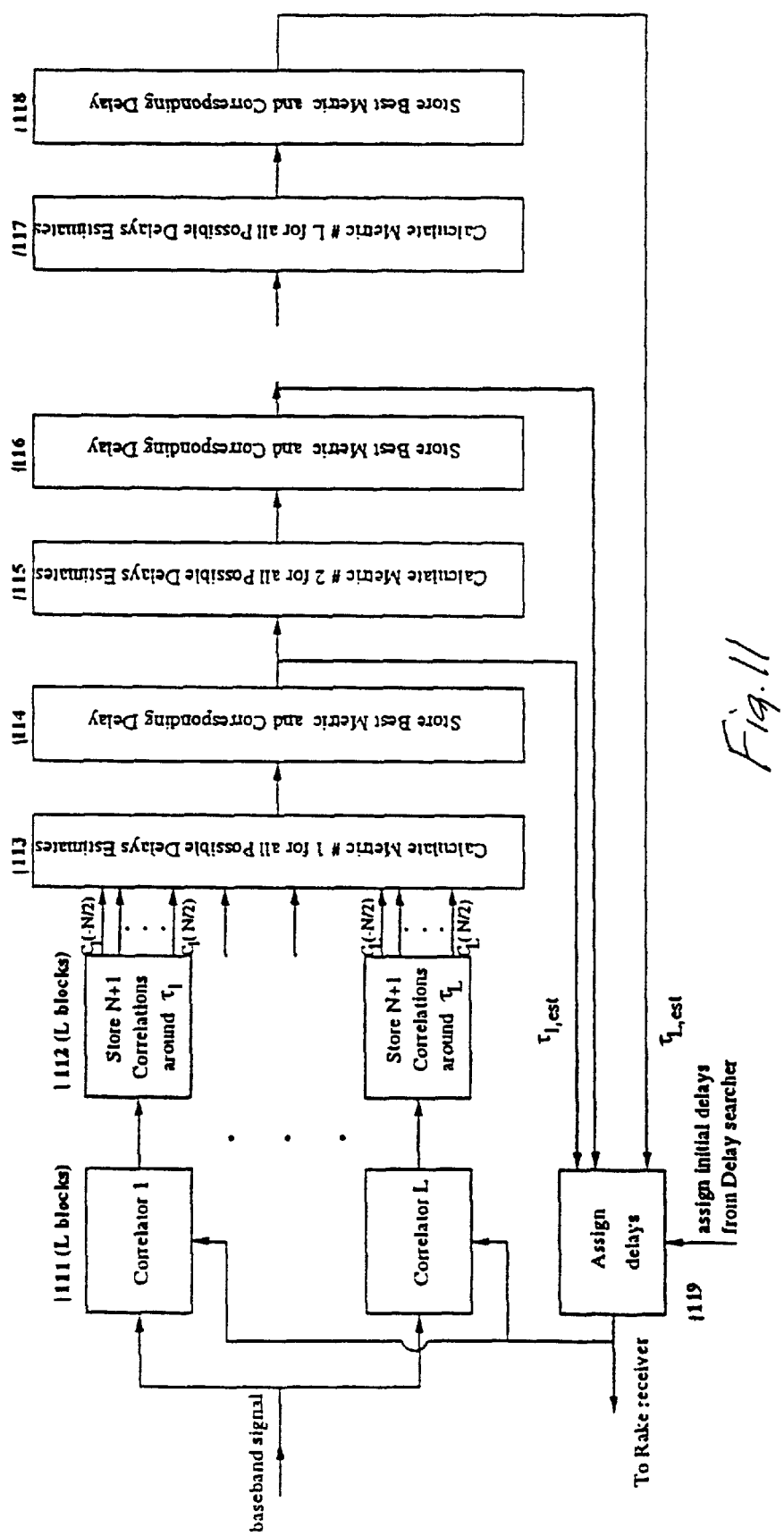
FIG. 11 is a block diagram of a system that performs iterative metric-based delay estimation, consistent with the invention.

A sub-optimal iterative variation is to assume that ŷ(t) includes one path only. We estimate the delay of that path by minimizing the metric, a task which in essence becomes finding the peak correlation. Then, we fix the first estimated delay and assume that ŷ(t) includes two paths, the first path already estimated plus a second, unknown delay. We consider candidate sets which have the first delay set to the first path's estimated delay, but vary the second path's delay. The second path's delay which minimizes the metric gives the second path's estimated delay. The process is repeated for more delay estimations. Once this suboptimal approach is completed, the optimal approach can be performed by considering candidate delay sets that are near the first set of estimates. This is shown in FIGS. 11 and 12, except that the ML metric is used instead.

The present invention is also applicable to multi-antenna reception, using diversity antennas, phased arrays, and possibly beam forming. Delay estimation is performed on each of M input channels. Either each channel has L fingers or LM fingers are freely allocated among the channels. Joint ML or MMSE metrics can be used, as well as signal strength selection.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. For example, metrics other than ML or MMSE can be used to estimate multipath delays. Accordingly, it is expressly intended that all such variations, changes and equivalents which fall within the spirit and scope of the present invention as defined in the claims be embraced thereby.

What is claimed is:

1. A delay estimation unit comprising:
   means for generating correlation values corresponding to a plurality of delay values;
   means for computing a first largest correlation value;
   means for producing a first delay estimate using a delay value associated with the largest correlation value;
   means for processing the correlations values by modifying at least one correlation value to produce processed correlation values;
   means for computing a largest processed correlation value; and
   means for producing a second delay estimate using a delay associated with the largest processed correlation value.

2. The delay estimation unit of claim 1, wherein the generating means produces correlation values for only those delay values that are within intervals that include delay estimates.

3. The delay estimation unit of claim 1, wherein the generating means produces correlation values for delay values within a contiguous set.

4. The delay estimation unit of claim 1, wherein the processing means modifies at least one correlation value by setting it to zero.

5. The delay estimation unit of claim 1, wherein the processing means modifies at least one correlation value by subtracting a component associated with the delay value associated with the largest correlation value.

6. The delay estimation unit of claim 5, wherein subtraction is performed using a correlation value and side information.

7. The delay estimation unit of claim 6, wherein the side information is related to the chip pulse shape.

8. The delay estimation unit of claim 6, wherein the side information is related to the spreading sequence.

9. A delay estimation unit comprising:
   means for generating correlation values corresponding to a plurality of delay values;
   means for computing a first largest correlation value and a first delay value associated with the first largest correlation value;
   means for producing a first delay estimate using the first delay value;
   means for computing a second largest correlation value from a subset of the correlation values and producing an associated second delay value; and
   means for producing a second delay estimate using the second delay value.

10. A receiver comprising:
    signal delay estimation means for providing delay estimates by generating correlation values corresponding to a plurality of delay values, computing a first largest correlation value, producing a first delay estimate using a delay associated with the largest correlation value, processing correlation values by modifying at least one correlation value to produce processed correlation values, computing a largest processed correlation value, and producing a second delay estimate using a delay associated with the largest processed correlation value; and
    data detection means for using the first and second delay estimates to detect information symbols.

11. A method for estimating delays, comprising the steps of:
    generating correlation values corresponding to a plurality of delay values;
    selecting a largest correlation value;
    producing a first delay estimate using a delay corresponding to the largest correlation value;
    processing the correlation values by modifying at least one correlation value to produce processed correlation values;
    selecting a largest processed correlation value; and
    producing a second delay estimate using a delay associated with the largest processed correlation value.

12. The method of claim 11, wherein the processing step includes modifying at least one correlation value by setting it to zero.

13. The method of claim 11, wherein the processing step includes modifying at least one correlation value by subtracting a component associated with the delay associated with the largest correlation value.

14. The method of claim 13, wherein the subtraction uses a known correlation function.

15. The method of claim 11, wherein the steps of selecting, updating and processing are repeated until a predetermined number of delay estimates have been updated.

16. The method of claim 15, wherein the repeated steps are performed in ray strength order.

17. A delay estimation unit comprising:
    means for producing a set of delay estimates;
    means for generating correlation values corresponding to a plurality of delay values;
    means for processing the correlation values by modifying the correlation values in accordance with the set of delay estimates to produce processed correlation values; and
    means for refining the delay estimates using the processed correlation values.

18. A method for estimating at least one delay, comprising the steps of:

producing a set of delay estimates;

generating correlation values corresponding to a plurality of delay values;

processing the correlation values by modifying the correlation values in accordance with the set of delay estimates to produce processed correlation values; and refining the delay estimates using the processed correlation values.

19. The method of claim 18, further comprising repeating the steps of processing and refining.

20. The method of claim 18, further comprising repeating the steps of processing and refining until each of a plurality of delay estimates has been refined.

21. The method of claim 18, wherein the processing step includes modifying at least one correlation value by subtracting at least one component associated with a delay in the set of delay estimates.

22. A delay estimation unit comprising:

means for generating correlation values at a plurality of delays;

means for producing a plurality of candidate delay estimate sets;

means for calculating metrics associated with each candidate delay estimate set;

means for selecting a delay estimate set from among the plurality of candidate delay estimate sets using the calculated metrics; and means for producing a plurality of delay estimates using the selected delay estimate set.

23. The delay estimation unit of claim 22, wherein correlation values are only generated for delays near at least one initial delay estimate.

24. The delay estimation unit of claim 22, wherein:

each metric represents a squared error between the correlation values and a weighted summation of correlation functions that are delayed using ones of the plurality of candidate delay estimates.

25. The delay estimation unit of claim 22, wherein each metric is a maximum likelihood estimation metric.

26. The delay estimation unit of claim 22, wherein each metric uses correlation values associated with candidate delay estimates in one of the candidate delay estimate sets.

27. The delay estimation unit of claim 22, wherein each metric uses channel coefficient estimates.

28. The delay estimation unit of claim 22, wherein each metric uses pulse shape information.

29. A method for estimating at least one delay, comprising the steps of:

generating correlation values at a plurality of delays;

producing a plurality of candidate delay estimate sets;

calculating metrics associated with each candidate delay estimate set to produce calculation results;

selecting one of the calculation results; and producing a plurality of delay estimates using the candidate delay estimate set that corresponds to the selected calculation results.

30. The method of 29, wherein:

the metrics represent squared errors between the correlation values and weighted summations of correlation functions that are delayed using ones of the plurality of candidate delay estimates.

31. The method of claim 29, wherein each metric is calculated using correlation values associated with candidate delay estimates in one of the candidate delay estimate sets.

32. The method of claim 29, wherein each metric is calculated using channel coefficient estimates.

33. The method of claim 29, wherein each metric is calculated using pulse shape information.

34. A delay estimation unit comprising:

means for generating correlation values at a plurality of delays;

means for producing candidate first delay estimates;

means for calculating a first set of metrics associated with the candidate first delay estimates;

means for selecting a best metric from the first set of metrics to produce a first delay estimate;

means for producing candidate second delay estimates;

means for calculating a second set of metrics associated with the candidate second delay estimates; and means for selecting a best metric from the second set of metrics to produce a second delay estimate.

35. The delay estimation unit of claim 34, wherein the metrics represent squared errors between the correlation values and weighted summations of correlation functions that are delayed using ones of the plurality of delay estimates.

36. The delay estimation unit of claim 34, wherein the metrics represent a maximum likelihood estimation metric.

37. The method of claim 34, wherein each set of metrics is calculated using correlation values associated with candidate delay estimates in one of the candidate delay estimate sets.

38. The method of claim 34, wherein each set of metrics is calculated using channel coefficient estimates.

39. The method of claim 34, wherein each set of metrics is calculated using pulse shape information.

40. A method for estimating at least one delay, comprising the steps of:

generating correlation values at a plurality of delays;

producing a plurality of candidate first delay estimates;

calculating a set of first metrics associated with the candidate first delay estimates to produce a first calculation result;

producing a first delay estimate based on the first calculation result;

producing a plurality of candidate second delay estimates;

calculating a set of second metrics associated with the candidate second delay estimates to produce a second calculation result; and producing a second delay estimate based on the second calculation result.

41. The method of 40, wherein the metrics represent squared errors between the correlation values and weighted summations of correlation functions that are delayed using ones of the plurality of candidate delay estimates.

42. The method of claim 40, wherein each set of metrics is calculated using correlation values associated with candidate delay estimates in one of the candidate delay estimate sets.

* * * * *